(12) United States Patent
Schlunk

(10) Patent No.: US 7,698,195 B2
(45) Date of Patent: Apr. 13, 2010

(54) SYSTEMS AND METHODS FOR IMPROVING INVESTING

(75) Inventor: Otmar Schlunk, Irvine, CA (US)

(73) Assignee: Cashflow Technologies, Inc., Scottsdale, AZ (US)

( * ) Notice: Subject to any disclaimer, the term of this patent is extended or adjusted under 35 U.S.C. 154(b) by 1660 days.

(21) Appl. No.: 10/830,836

(22) Filed: Apr. 22, 2004

(65) Prior Publication Data

US 2005/0240500 A1 Oct. 27, 2005

(51) Int. Cl.
*G06Q 40/00* (2006.01)

(52) U.S. Cl. .................................................. 705/36 R

(58) Field of Classification Search ............. 705/35–45, 705/99
See application file for complete search history.

(56) References Cited

U.S. PATENT DOCUMENTS

| | | | |
|---|---|---|---|
| 4,363,489 A | 12/1982 | Chodak et al. | |
| 5,826,878 A | 10/1998 | Kiyosaki et al. | |
| 6,199,030 B1 * | 3/2001 | Stone | 703/8 |
| 6,236,955 B1 * | 5/2001 | Summers | 703/6 |
| 6,321,205 B1 | 11/2001 | Eder | |
| 6,336,094 B1 | 1/2002 | Ferguson et al. | |
| 6,375,466 B1 | 4/2002 | Juranovic | |
| 6,634,950 B2 | 10/2003 | Yoshimi et al. | |
| 6,709,330 B1 * | 3/2004 | Klein et al. | 463/9 |
| 6,745,150 B1 * | 6/2004 | Breiman | 702/181 |
| 6,745,170 B2 | 6/2004 | Bertrand et al. | |
| 6,764,077 B1 * | 7/2004 | Miravete | 273/256 |
| 2001/0027430 A1 | 10/2001 | Sabourian | |
| 2002/0013762 A1 | 1/2002 | Yoshimi et al. | |

OTHER PUBLICATIONS

Artificial Stock Market for Testing Price Prediction Models. Malik S. 2004 2nd International IEEE Conference on Intelligent Systems. Proceeding (IEEE Cat. No. 04EX791). p. 75-80 vol. 3.*
Pricing Short Leases and Break Clauses Using Simulation Technology. Patrick McAllister. Journal of Property Investment & Finance. V19n4 pp. 361-374 2001.*
Experience with Running Market-Simulation Studies. Marmiroli M. et al. 2003 IEEE Power Engineering Society General Meeting (IEEE Cat. No. 03CH37491). 377 vol. 1.*
Dictionary of Business Terms, Third Edition, 2000, definition of generally accepted accounting principles, p. 285.

* cited by examiner

*Primary Examiner*—Hani Kazimi
*Assistant Examiner*—Clifford Madamba
(74) *Attorney, Agent, or Firm*—David E. Rogers; Alex Starkovich; Squire, Sanders & Demspey L.L.P.

(57) ABSTRACT

Users of a simulator gain skills for investing using a simulator. The simulator simulates a business system that conducts a market transaction. The simulator selects a set of factors from a plurality of sets; selects a current factor from the selected set; and determines a price in accordance with the current factor. The simulator further updates a financial position of the user of the simulator in response to a transaction; and performs the transaction in accordance with the price and an input from the user. The input from the user corresponds in content to an input to the business system. Consequently, the user develops skill in specifying market transactions to be conducted by reviewing changes in the user's financial position. The simulator may include a simulated competitor having a financial position affected by transactions according to a strategy of the competitor selected from a set of stored strategies.

14 Claims, 4 Drawing Sheets

SYSTEMS AND METHODS FOR IMPROVING INVESTING

FIELD OF THE INVENTION

Embodiments of the present invention relate to simulation of business systems that conduct market transactions.

BACKGROUND OF THE INVENTION

Business systems that conduct market transactions are well known. Such systems include for example manual and automated organizations and recording offices for determining and changing the ownership of business entities, real estate, and commercial paper. Traditionally, these systems are based entirely on records formed on papers (e.g., formation of entities, agreements, purchases and sales); and based on organizations that handle such papers (e.g., negotiators, persons who sign papers, and recording offices that make official copies of papers available to others). Access to these systems is generally limited to registered brokers and accredited investors.

Some markets today are accessible via business systems that are fully automated (e.g., based on electronic data processing, electronic signatures, and electronic funds transfer). For instance, systems for changing the ownership of stock in a corporate business entity electronically maintain records of title and value of ownership positions, and perform electronic transactions that change these ownership positions. Recently, individuals having no prerequisite financial education have access to business systems that perform market transactions and may use such systems for investing on their own account. By operating such business systems, the operator (e.g., a private investor) may research entities, obtain quoted values of stock in entities, and specify trades to acquire or change holdings in entities. For example, the Internet provides many web sites (e.g., www.etrade.com) presenting user interfaces for business systems including business systems that conduct stock market transactions.

Improper operation of business systems that conduct market transactions for an investor place the investor at greater risk of loss or incur actual loss to the financial position of the investor. Participation by unskilled investors in some markets may make those markets more volatile for all participants. Governments may view volatility in markets as a problem to be controlled and further upset free market dynamics.

Operators of complex military systems are conventionally trained using simulators. Generally, a simulator forces a trainee to make decisions in a manner that develops skills that are transferable to operating the complex systems. For instance a military aircraft is a complex electronic and mechanical system that requires skill to pilot. Simulators for military aircraft are well known for training pilots. Pilots who have operated simulators have demonstrated that skills acquired via simulation are transferable to skilled operation of the military aircraft. Skills relate to tactics (e.g., how to fly the plane and how to accurately apply deadly force) and strategy (e.g., how to accomplish a mission by managing risk during a flight).

Simulators for operating business systems that conduct market transactions are not widely available and so are not widely used. A suitable simulator should present a relatively simple user interface that focuses attention on those aspects of the simulation that are desirable for quickly acquiring transferable skills. The simulator should also be responsive so that skills are developed in a minimum of time. Because a simulator is a limited resource, making use of the simulator efficient should consequently increase the capacity of the simulator for use by many trainees in serial or in parallel or both. In other words, as the efficiency of the simulator increases, more trainees should have access to the limited resource of the simulator. The cost of providing a simulator should also decrease per trainee as the efficiency and/or scale of the simulator is increased.

Conventional simulators of business systems that conduct market transactions are complex and relatively unresponsive. These characteristics deter trainees from reaching goals of desired increased skills, cause training to take too long to acquire skills, discourage operators from persisting with the simulator based training, and make operation of the simulator inaccessible to a large number of unskilled persons desiring to become skilled operators for improved investing.

There are numerous social consequences of failing to employ skilled operators of business systems that conduct market transactions. Without skilled investors investment capital that could be available is unavailable. Consequently new products do not come to market, new groups cannot form for launching new ventures, forming new entities, and bringing new business models to investors and to the market. New sources of tax revenue are unavailable so that existing national defense, education, health, and welfare programs are relatively under funded and/or new programs for these societal goals cannot be launched.

Business systems for conducting market transactions that allocate resources to unskilled users may operate less efficiently for all users due to practical limits on resource availability. Resources include bandwidth for communication, processing time, and data storage. Use of such systems by unskilled users necessarily consumes resources that could have been more efficiently used by skilled users. The cost of use by all users must be borne by skilled and unskilled users. Use by unskilled users may increase the costs for skilled users to use such a system. These systems may provide an unskilled user an environment for learning by trial and error; however, such a learning environment is not efficient for quick mastery of skills. This failure is due in part to the specialization of such conventional business systems (e.g., limited to executing stock transactions without knowledge of a complete financial position of the user).

Without systems and methods for training in the operation of business systems that conduct market transactions, many persons desiring to become skilled investors cannot reach this goal and are thereby financially handicapped. Further, investors without suitable skills may fail to employ reliable tactical and strategic operations when operating business systems that conduct market transactions with negative consequences personally and for society as discussed above.

SUMMARY OF THE INVENTION

A simulator, according to various aspects of the present invention, simulates a business system that conducts a market transaction. The simulator includes one or more engines that determine a price for an opportunity to participate in the market. Determining the price may include selecting a set of factors from a plurality of sets; selecting a current factor from the selected set; and determining a price in accordance with the current factor. The one or more engines may further update a financial position of the user of the simulator in response to a transaction; and perform the transaction in accordance with the price and an input from the user. The input from the user corresponds in content to an input to the business system whereby the user develops skill in specifying market transactions to be conducted by reviewing changes in the user's financial position.

A method, according to various aspects of the present invention, is performed by a computer system having a user. The method simulates a business system that conducts a market transaction. The method includes determining a price for an opportunity to participate in the market. Determining the price may include selecting a set of factors from a plurality of sets; selecting a current factor from the selected set; and determining a price in accordance with the current factor. The method may further include updating a financial position of the user in response to a transaction; and performing the transaction in accordance with the price and an input from the user, the input from the user corresponding in content to an input to the business system whereby the user develops skill in specifying market transactions to be conducted by reviewing changes in the user's financial position. A memory device, according to various aspects of the present invention, includes instructions for a computer system to perform this method.

A simulator, according to various aspects of the present invention, simulates a business system that conducts a market transaction. The simulator includes one or more engines that updates a first financial position of a simulated competitor that uses the business system for a first transaction; updates a second financial position of the user in response to a second transaction; and performs the second transaction in accordance with an input from the user. The input from the user corresponds in content to an input to the business system whereby the user develops skill in specifying market transactions to be conducted by reviewing changes in the user's financial position and by being aware of the first transaction and the simulated competitor's financial position. The simulated competitor may determine whether to participate in the first transaction in accordance with a strategy selected from a set of stored strategies.

A method, according to various aspects of the present invention, for simulating a business system that conducts a market transaction includes updating a first financial position of a simulated competitor that uses the business system for a first transaction; updating a second financial position of the user in response to a second transaction; and performing the second transaction in accordance with an input from the user. The input from the user corresponding in content to an input to the business system whereby the user develops skill in specifying market transactions to be conducted by reviewing changes in the user's financial position and by being aware of the first transaction and changes in the simulated competitor's financial position. The simulated competitor may determine whether to participate in the first transaction in accordance with a strategy selected from a set of stored strategies. A memory device, according to various aspects of the present invention, includes instructions for performing this method.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Business systems that perform market transactions seem to be deceptively simple to operate. Use of such a system may appear to hinge on one user action (e.g., a click through) authorizing a transaction. A user conventionally selects a system suitable for a desired market, specifies a financial account to use for the transaction (e.g., principal, costs, proceeds), specifies the transaction to be performed (e.g., number of shares or options, price or price limits, trade date and time), type of transaction (e.g., buy, sell, put, call), and indicates his or her authorization (e.g., buy/sell order) to complete the transaction. Any conventional business system (e.g., a web site, a trading terminal) for any conventional market may be used (e.g., stocks, bonds, other commercial paper, futures, real estate, trusts, partnerships, intellectual properties). Unskilled users of such systems may lack skills in determining any of the foregoing specifications and the authorization. Negative consequences may result as discussed above.

Figure 1:
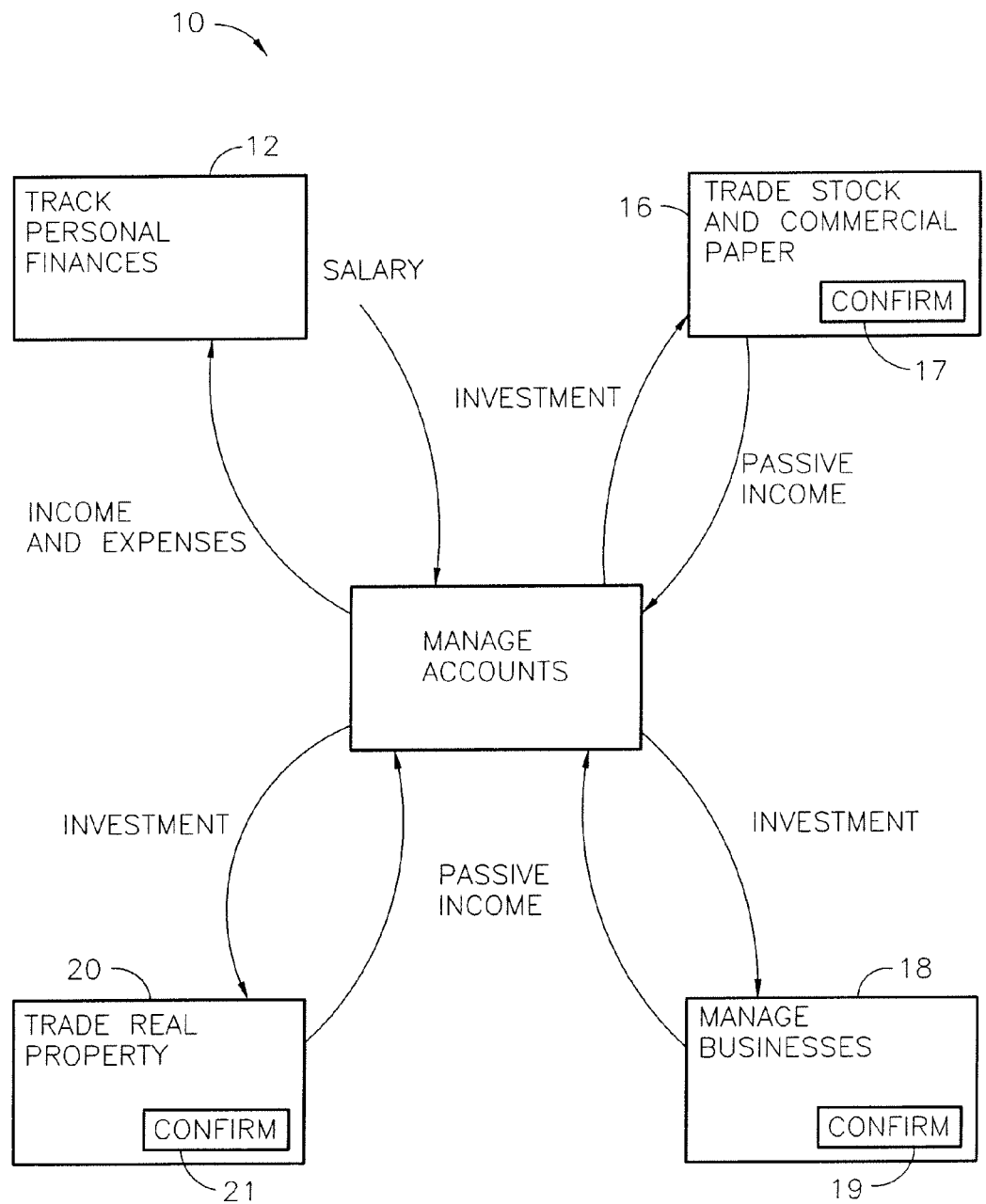
FIG. 1 is a functional block diagram of business systems to be simulated by systems and methods of the present invention.

For example, a conventional network of business systems 10 of FIG. 1 includes system 12 for tracking personal finances, system 14 for managing accounts, system 16 for trading stock and commercial paper, system 18 for managing businesses and business interests, and system 20 for trading real property. All communication between systems 12-20 is accomplished via a network (not shown) to which each system is coupled for communication. System 12 provides a user interface for user access to all other systems 14-20 of system 10. is a typical personal computer used by an individual to keep a home budget and access the other systems 14-20. System 12 accesses account information at one or more banks and credit card processors (e.g., web sites) 14 to track automatic deposits of the user's salary and expenses (e.g. checks that have cleared, credit card charges and payments). The user may also access system 16 (e.g., another web site) to buy and sell stocks on his account. Each transaction is authorized by operation by the user of a control of a user interface (e.g., a button 17 operated by mouse click for confirming a transaction). The user may further access system 18 for buying and selling real estate or real estate trust positions; confirmation of transactions being by control 19 analogous to control 17 discussed above. Still further, the user may access system 20 for buying and selling (or managing) businesses; confirmation of transactions being by control 21 analogous to control 17 discussed above. Each system 16, 18, and 20 receives investments from the user from system 14 by electronic funds withdrawal and provides passive income to the user as electronic funds transfer deposits to system 14. An unskilled user may operate controls 17, 19, and/or 21 in a manner that causes the problems discussed above.

A system according to various aspects of the present invention teaches a user skills that are transferable to improved operation of business systems (e.g., 16, 18, and 20) discussed above. Improved operation generally includes improved investing for the user's account(s) (e.g., 14). The improvement may be in reducing financial risk that the user could otherwise be exposed to; and/or obtaining an improved financial position as understood by the application of generally accepted accounting practices (GAAP). Teaching is accomplished in part by presenting to the user various opportunities that the user is asked to decide to authorize or to pass. The opportunities are based on simulated market conditions. According to various aspects of the present invention, the user may learn tactics (e.g., how to evaluate a particular opportunity) and may learn strategies (e.g., acquiring assets, then using assets to increase cash flow).

A system according to various aspects of the present invention may be implemented as a stand alone station (e.g., for use by one or more users in turn); or as a network of clients and/or servers. Conventional client/server and client/client technologies may be used. Stand alone implementations include general purpose computers (e.g., lap top, desk top, palm top, cell phone) having user interfaces and include general or special purpose gaming devices having interfaces to use a conventional television set as a display and any conventional gaming user interface unit (e.g., hand held joy stick and gaming push button switches).

For example, system 100 of FIGS. 2A, 2B, 3, and 4 includes server 102, network 104, client 106, and station 108. Server 102 represents any number of computer systems having conventional software for coupling to a network (e.g., the Internet) via a conventional link 103 and software for teaching as discussed herein. Client 106 represents any number of computer systems having conventional software (e.g., a browser) for communicating with one or more servers via a conventional link 105. In one implementation servers are omitted and clients communicate with each other using conventional technology and software installed on one or both clients for teaching as discussed herein. Links 103 and 105 support signals for transferring (e.g., downloading) software and for conveying messages between processes to accomplish methods discussed herein. In another implementation, client 106 includes a conventional browser (e.g., Internet Explorer marketed by Microsoft) and server 102 includes all training software (e.g., except for conventional cookies and applets as may be used by the browser).

Figure 2A:
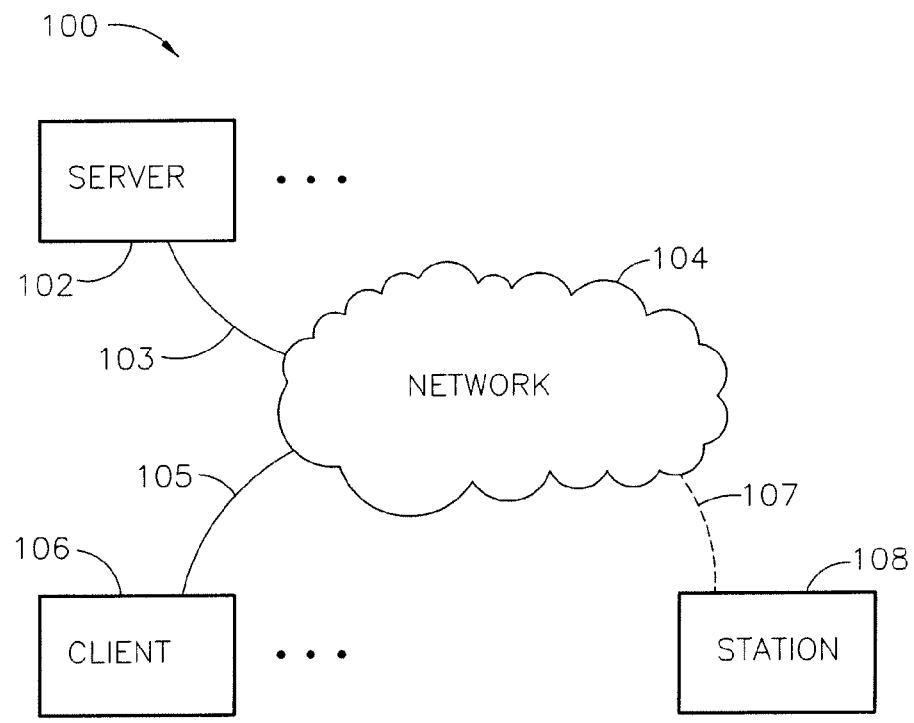
FIG. 2A is a functional block diagram of system according to various aspects of the present invention.
Figure 2B:
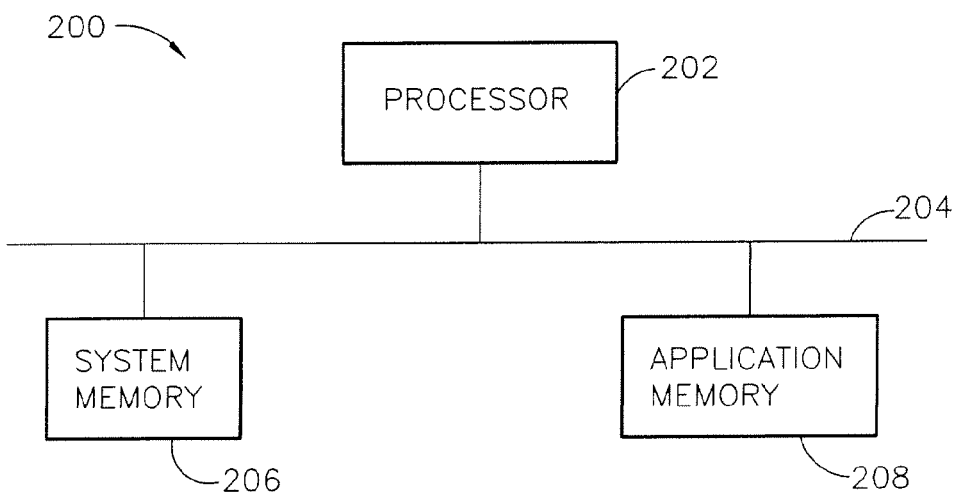
FIG. 2B is a functional block diagram of an engine for use in the system of FIG. 2A.

Station 108 represents any number of computer systems, each operating independently of all other entities shown in FIG. 2A. A station 108 may communicate with other servers, clients, or stations via network 104 temporarily via link 107 as desired (e.g., product registration, download of software and updates, sharing of usage reports, or training progress reports). A stand alone station 108 in one implementation includes processes of server 102 and client 106 adapted using conventional techniques to operate without a network and with the user interface of station 108 (e.g., computer monitor, LCD cell phone display, television set).

Processes performed by computer systems (e.g., servers, clients, and stand alone stations) of FIG. 2A may be performed by one or more engines. An engine includes any circuit, firmware, and software for performing stored program instructions. The logic of the process may be performed to any extent by circuitry and/or program instructions. For example, engine 200 or FIG. 2B includes a processor 202, bus 204, system memory 206, and application memory 208. Engine 200 may include interfaces (not shown) to conventional peripherals such as displays and keyboards. A server 102 includes any number of engines 200 and may omit peripherals (except possibly for administrative control of a server). A client 106 or a station 108 may include any number of engines 200 and interfaces for user interaction with teaching software discussed herein. Memory (206, 208) may include any combination of conventional memory devices (e.g., disks, CDROMs, semiconductor RAM, EPROM) and may be divided as shown to simplify use of the engine for application programs different from training software described herein. For example, application memory may be packaged as a game module to be inserted into a station (e.g., a Microsoft X-Box). In one implementation, a game module includes an engine 200 programmed to perform teaching software as discussed herein. In another implementation, engine 200 is formed on a semiconductor substrate.

Methods according to various aspects of the present invention teach a user skills for improved investing as discussed above. These methods may be implemented with any number of user processes and competitor processes and at a minimum include one user process and no competitor processes. System 100 conducts any number of sessions simultaneously, each session comprising a context for competition among users (if more than one) and competitor processes (if any). In an implementation discussed below, system 100 provides in each session a simulator of a business system that performs a market transaction as discussed above; and, among other functions, presents opportunities for transactions on a simulated market served by that business system. A user process presents hypothetical opportunities, reports, and descriptions of financial positions; and, responds to inputs from the user to perform simulated transactions. A competitor process manages a unique financial position that changes to simulate the actions and responses of a hypothetical user competing against the user.

Simulating a business system that performs a market transaction may include merely providing a user interface that accepts a buy/sell order as discussed herein. In one implementation, the user interface includes hardware cooperating with software to display a presentation having a control and to accept input from a pointing device (e.g., a mouse) operated by the user for operating the control. In another implementation, additional user interface controls and presentations are included in the simulation to add realism or to improve the transfer of skills to a particular business system. As discussed herein, significantly transferable skills related to improved investing may be acquired by simulating merely the input of the buy/sell order, the complete specification of the order (e.g., the number of shares, price per share, and date of transaction) being understood from the training software by the user at the time of input of the buy/sell order. In an alternate implementation, the user may be required to enter any or all of a specification of a transaction.

A user process interacts with a conventional user interface (not shown) in any conventional manner. The user process and user interface may be performed by (i.e., hosted on) the same engine or different engines may be in communication in any conventional manner (e.g., shared memory, operating system calls, remote procedure calls, protocol stacks, message handlers, and/or via links and networks). As discussed below, processes may be responsive to user input and provide presentations for user review by interacting with peripherals (e.g., keyboards and monitors), interacting with a conventional user interface, or interacting with communication software.

Figure 3:
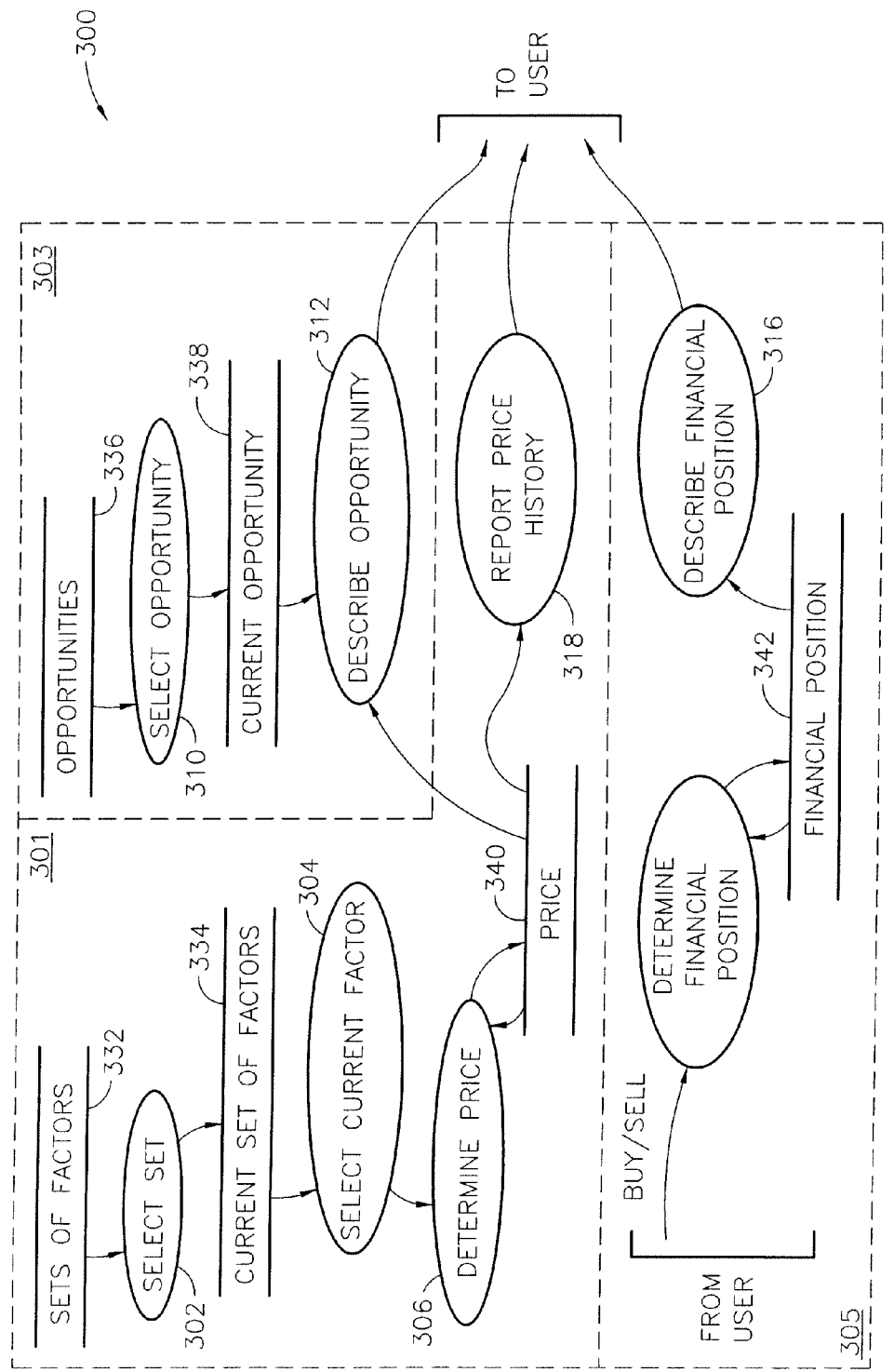
FIG. 3 is a data flow diagram of a user process according to various aspects of the present invention.
Figure 4:
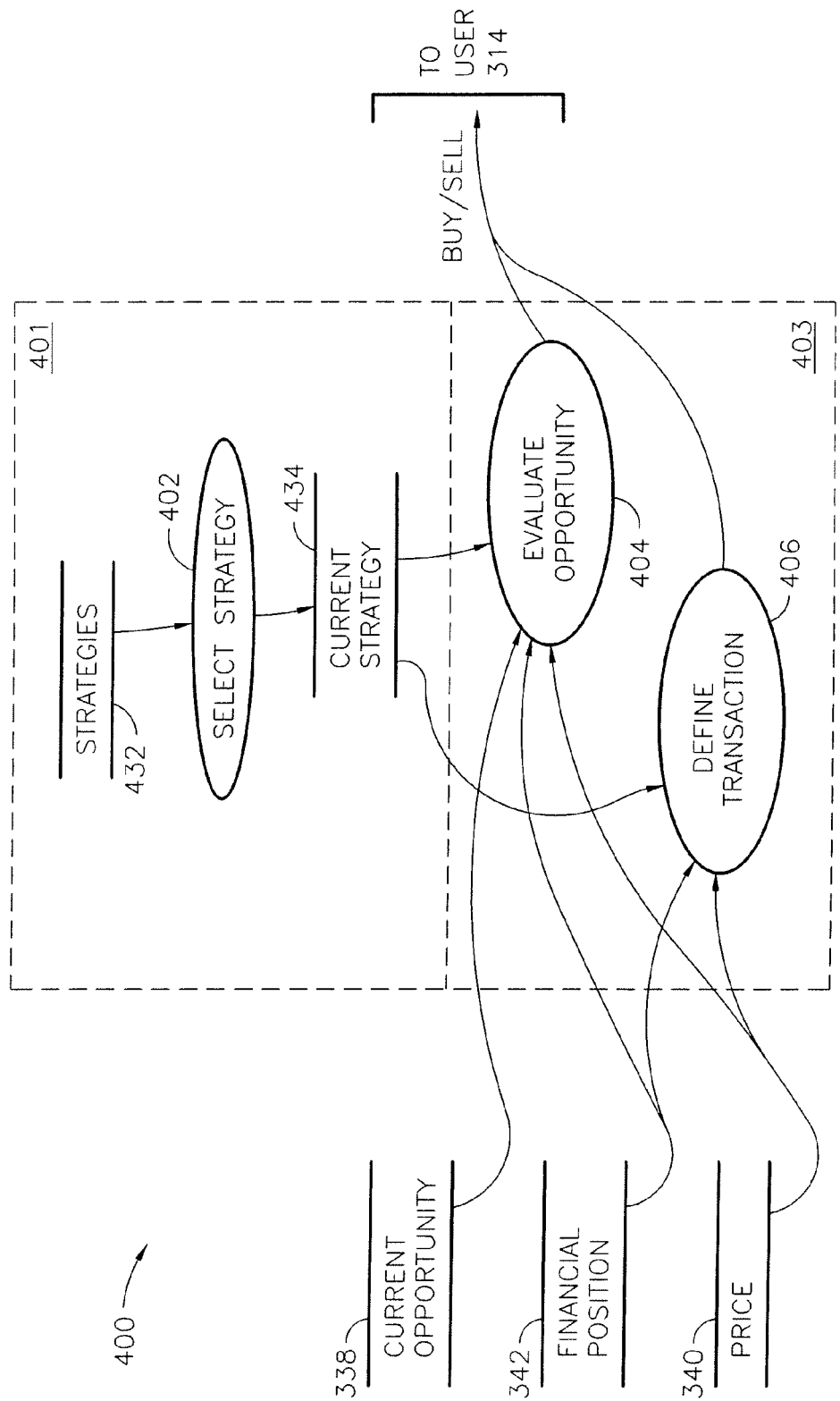
FIG. 4 is a data flow diagram of a competitor process according to various aspects of the present invention.

For example, user process 300, of FIG. 3, includes pricing engine 301, opportunity engine 303, and financial position engine 305. These engines may be implemented on any combination of physical processors, circuits, and memory devices, on one or more servers and/or on one or more clients as discussed above. A pricing engine determines a price for an item that is the subject of a transaction on a market. A pricing engine may determine a forecast of prices for each of a multitude of items on each of several markets. For example, pricing engine 301 includes sets of factors store 332, select set process 302, current set of factors store 334, select current factor process 304, determine price process 306, price store 340, and report price history process 318.

Sets of factors store includes a set of factors for each of several price patterns. Six example price patterns are described in Table 1 and specified for each market interval in Table 2. Each pattern has a unique pattern length as illustrated in Table 2. Alternatively, sets of factors may be uniform in quantity of members of each set. Each set of factors may be scaled or subject to an offset, floor, or ceiling as desired to more suitably simulate a price pattern of a particular type of item and/or type of market.

TABLE 1

| Pattern Symbol | Pattern Description |
| --- | --- |
| K1 | Symmetric triangle |
| K2 | Rectangle |
| K3 | Ascending triangle |
| K4 | Bankruptcy |
| K5 | Cup |
| K6 | Head and shoulders |

TABLE 2

| Market Interval | K1 | K2 | K3 | K4 | K5 | K6 |
| --- | --- | --- | --- | --- | --- | --- |
| 1 | 1.10 | 1.10 | 1.10 | 0.90 | 1.10 | 1.10 |
| 2 | 1.10 | 1.10 | 1.10 | 0.90 | 1.10 | 1.10 |
| 3 | 1.10 | 1.10 | 1.10 | 0.90 | 1.10 | 1.09 |
| 4 | 1.10 | 1.10 | 1.10 | 0.90 | 1.00 | 1.07 |
| 5 | 1.10 | 1.10 | 1.10 | 1.00 | 0.95 | 1.07 |
| 6 | 1.10 | 0.90 | 0.90 | 1.10 | 0.95 | 0.94 |
| 7 | 0.90 | 0.90 | 0.90 | 1.10 | 0.95 | 0.94 |
| 8 | 0.90 | 0.90 | 0.90 | 0.85 | 0.95 | 0.97 |
| 9 | 0.90 | 1.10 | 1.10 | 0.85 | 0.97 | 1.07 |
| 10 | 0.90 | 1.10 | 1.10 | 0.85 | 1.00 | 1.07 |
| 11 | 0.90 | 1.10 | 1.10 | 0.70 | 1.00 | 1.07 |
| 12 | 1.10 | 0.90 | 0.90 | 1.00 | 1.03 | 1.10 |
| 13 | 1.10 | 0.90 | 0.90 | 1.10 | 1.04 | 0.93 |
| 14 | 1.10 | 0.90 | 1.10 | 1.10 | 1.05 | 0.93 |
| 15 | 0.90 | 1.10 | 1.10 | 0.07 | 1.05 | 0.93 |
| 16 | 0.90 | 1.10 | 0.90 | 0.06 | 1.04 | 0.93 |
| 17 | 1.10 | 1.10 | 1.10 | 0.06 | 1.03 | 1.07 |
| 18 | 1.10 | 0.90 | 1.10 | 1.10 | 1.00 | 1.07 |
| 19 | 1.10 | 0.90 | 1.10 | 1.10 | 0.99 | 1.04 |
| 20 | 1.10 | 0.90 | 1.10 | 0.04 | 1.01 | 0.93 |
| 21 | 1.10 | 1.10 |  | 0.04 | 1.03 | 0.93 |
| 22 |  | 1.10 |  | 0.04 | 1.05 | 0.93 |
| 23 |  | 1.10 |  | 0.04 | 1.07 | 0.90 |
| 24 |  | 1.10 |  |  | 1.07 | 0.87 |
| 25 |  | 1.10 |  |  | 1.07 | 0.85 |
| 26 |  | 1.10 |  |  |  | 0.83 |
| 27 |  |  |  |  |  | 0.80 |
| 28 |  |  |  |  |  | 0.75 |

Select set process 302 selects a set of factors from sets of factors store 332 one for and market. Selection may be at random among sets of factors 332. Selection may be accomplished initially (e.g., part of initialization of a session for a particular user); and may be repeated at any time to extend the current set of factors to any suitable future extent. After the last specified factor of a first pattern, the factor for the first market interval of the subsequently selected pattern is used. Select set process 302 selects a set, associates the selected set with an item of a market, and stores the associations in current set of factors 334. The associations may be stored in any conventional manner (e.g., copy of set stored from 332 to 334, adjusted copy of set 332 stored in 334, or pointer to set in 332 stored in 334). Ring buffers (for repeating patterns) and linked lists may be used.

For each market interval, a factor from each respective set is identified for use in determining a price for the associated item. For example, select current factor process 304 keeps track of the current market interval for each current set 334 for each item, and, on request from determine price process 306 provides a suitable factor. In one implementation, store 334 comprises a pointer for each item accessible by name of the item. On request for a current price for a named item, process 304 accesses store 334 to obtain a pointer value. Store 334 is indexed by name of item. Process 304 advances the pointer value by one market increment and then accesses store 332 using the incremented pointer value. Store 332 is indexed by the pointer value to provide a current factor.

In one implementation, the current factor of the current set for an item is applied to the price of the item in the immediately prior market interval ($P_{n-1}$) to determine a current price ($P_n$) for the item. That is, each next price in a forecast series of future prices is obtained by applying the corresponding factor for that future period to the price in the immediately prior period. For example, determine price process 306 determines a price for each item for each market for each market interval and stores these prices in prices store 340. A market interval may be any suitable period of time. For instance, a time interval may be an actual time period such as several minutes in real time that may correspond to scaled time for purposes of suitable simulation (e.g., an hour, a day). When organized for competition as discussed below, each user and competitor process may act in turn and each market interval may correspond to a turn. Each factor may be used as a mathematical factor that is applied by multiplying (e.g., the current factor times $P_{n-1}$ determines the current price $P_n$). In an alternative implementation factors are replaced by signed terms (positive or negative). Each current price $P_n$ is determined by adding the corresponding term to $P_{n-1}$. In another alternative, the term is scaled by a factor associated with the item and/or the market prior to use for addition.

Price store 340 includes prices for all items in all markets to assure that any price needed for an opportunity or transaction may be efficiently obtained. Prices may be kept for any suitable period of history prior to the current market interval.

Report price history process 318 responds to a conventional user input (not shown) to provide information for one or more tabular and/or graphic presentations to the user of prices for any suitable periods of time, items, and markets. Comparisons and contrasts may also be provided among any combination of prices of suitable items and patterns. Comparisons may be accompanied by a figure of merit indicating closeness of fit (e.g., variance, sum of differences squared). By retaining prior prices, a user may learn how to base a buy/sell order on a pattern he or she identifies in the history. At least four skills are taught: how to recognize a pattern, how to predict what the future of that pattern is likely to be, how to apply that prediction to a buy/sell order for a predefined opportunity, and how to fashion a user-defined transaction that is likely to improve the user's financial position in light of the predicted pattern.

An opportunity engine prepares an opportunity to participate in a transaction and provides information for a presentation of the opportunity to the user. Opportunity engine 303 includes opportunities store 336, select opportunity process 310, current opportunity store 338, and describe opportunity process 312.

An opportunities store provides storage for a plurality of opportunities regarding transactions for users and competitor processes involving any item or items from any market or markets. An opportunity may be fixed or dynamic. A fixed opportunity may be stored as a set of parameter values. A dynamic opportunity may include a stored algorithm (or reference to an algorithm) to be applied to current financial positions (342) and prices (340) to provide a dynamically defined opportunity. For example, opportunities store 336 provides fixed opportunities on request by select opportunity process 310.

Each opportunity of store 336, for instance, is of a type described in Table 3. In Table 3, binary values are indicated T/F for true or false. Currency is indicated in dollars, though any currency may be used. Values in quotes are exemplary. An opportunity may include a recurring expense (e.g., a loan payment) a recurring income (e.g., rent), and/or an expense (e.g., a tax, management fee, repairs) that may become due according to a hypothetical event (e.g., after a predetermined time, a time triggered by other events, or a random time) to simulate annual taxation or irregular repairs. An opportunity may be effect any of the parameters described below with reference to financial positions 342.

TABLE 3

| Type of Opportunity | Parameters and Example Values |
| --- | --- |
| Expense | Mandatory T/F; Charitable T/F; Description = "Buy a yacht."; Cost = "$30,000"; Down Payment = "$5,000"; Mortgage = "$25,000"; Cash Flow = "−$500"; Annual Expense = "$150". |
| Stock | Symbol = "OK4U"; Market = "NYSE"; Number of shares = "500" (or from user); Price per share = (from Prices 340); type of transaction = "short"; Dividends = "0"; Delay till settlement = "6 market intervals"; Projected ROI (Return on Investment). |
| Real Estate | Description = "Apartment Building"; Market = "Small Town"; Cost = "$300,000"; Down Payment = "$50,000"; Projected ROI = "35%"; Mortgage = "$250,000"; Cash Flow = "+$4,500". |
| Loan | Description = "Unsecured"; Cost = "$10,000"; Down Payment = "$0"; Cash on hand = "$10,000"; Cash Flow = "−$100". |

Select opportunity process 310 identifies an opportunity as the current opportunity 338. Identification may be by copying the opportunity from store 336 to store 338; or by storing a pointer in store 338 for access to the identified opportunity of store 336. Provision may be according to a random selection, according to a fixed series, or according to a dynamic series based on financial positions 342 and prices 340.

Describe opportunity process 312 provides information about the opportunity for presentation to the user or a competitor process. In the opportunity, references to information to be supplied by the user (e.g., desired number of shares) and references to current price (340) are added to the provided information by process 312.

A financial position engine maintains a financial position of a user or a competitor process. Maintenance includes determining respective initial values and updating values for each user and competitor process. Financial position engine 305 includes determine financial position process 314, financial position store 342, and describe financial position process 316.

A financial position includes parameters consistent with GAAP and operation of the business system that performs market transactions. For example, a financial position may include information of a conventional or simplified income statement and balance sheet. In one implementation, only those parameters stated in Table 4 are used so that training using system 100 is relatively efficient.

TABLE 4

| Group | Parameter of a Financial Position |
| --- | --- |
| Income statement— Income | Salary; Interest; Dividends; Real estate cash flows; Business cash flows; Passive income (all income except salary); |
| Income statement— Expenses | Taxes; Payments for mortgages and loans; Lumped expense related to raising children (e.g., the product of a fixed expense and the number of children); |
| Balance sheet— Assets | Savings; Symbol, number of shares, and cost per share of stock, mutual fund, or certificate of deposit; Real estate type, down payment, and total cost; Business type, down payment, and total cost; |
| Balance sheet— Liabilities | Initial principle amount of each mortgage and loan; Business liability; |

Cash flow as used in different contexts herein means either an asset's cash flow or a user (or competitive process's) cash flow. An asset's cash flow means the net income or expense of holding an asset (e.g., rental income or loss from real estate after maintenance and all other expenses). A user's cash flow means the sum of a user's (or competitive process's) salary and all asset cash flows (positive and negative) minus the sum of all expenses.

In response to a buy/sell order, the financial position of a user or a competitor process is updated by determine financial position process 314. Process 314 applies GAAP to update the respective financial position of each user and competitor that may be affected by one or more buy/sell orders involved in a single transaction. For example, when an asset is sold by one user (or competitor process) and purchased by another user (or competitor process), both the buyer's and seller's respective financial positions are updated. The buy/sell order may direct buy, sell, or pass on current opportunity 338; direct selling the current opportunity to another user (or competitive process); direct putting the current opportunity 338 up for auction among users and/or competitive processes; may further include a specification of a transaction to complete (e.g., an ad hoc order to liquidate an asset, pay off a loan, participate in an auction, make an offer to another user (or competitive process); or direct a response to an offer from another user (or competitive process).

Financial position store 342 may include a financial position for each user and each competitor process of the type described in Table 4. Accessed by determine financial position process 314 and describe financial position process 316 may be by user name (or competitive process name) and financial position parameter name.

Describe financial position process 316 provides information about the financial position of any user or competitor process for presentation to any particular user or to any competitor process.

Processes discussed above with reference to FIG. 3 may operate in a multi-threaded manner to support numerous sessions, each session preserving a state for all users and competitive processes of the respective session. Although sets of factors 332 and opportunities 336 may be common to all sessions, each session will typically have its own unique instance of current set of factors store 334, current opportunity store 338, prices store 340, and financial position store 342.

A competitor process performs automatically the operations of a hypothetical user having a selected level of skill. Each competitor process may have the same or a different level of skill relative to the human user(s) of the session and relative to other competitor processes of the session. A respective financial position is maintained for each competitor process. Each competitor process makes independent decisions on opportunities and/or defined transactions. For example, competitor process 400 includes strategy engine 401 and evaluation engine 403. These engines may be implemented on any combination of physical processors, circuits, and memory devices, on server(s) and/or client(s) as discussed above.

A strategy engine determines a strategy to be used by an instance of a competitor process. In one implementation, the strategy is determined once at the beginning of the session that includes the respective competitor process. Strategy engine 401 includes strategies store 432, select strategy process 402, and current strategy store 434. A strategy may be expressed as a set of parameter values as in Table 5. For example, strategies store 432 includes one set of parameter values for each of two strategies described in Table 5. In other implementations, any number of different strategies may be included in store 434.

Process 402 selects and initializes a strategy and stores the result in current strategy store 434 for each instance of a competitor. For example, selection of either of two strategies of Table 5 may be made by random selection, or according to user input (not shown). As shown, the strategy remains fixed for the duration of a session.

In Table 5, values specified as a range indicate that the value to be stored in the current strategy is selected (e.g., a random number) within the range by process 402. By selecting from within a range, different instances of competitor processes of the same strategy type have slightly different behaviors that are consequently less predictable by a user. Also, operation of the competitor process may proceed in one of two modes. In mode 1, the goal is to increase cash on hand. In mode 2, the goal is to increase the total of asset cash flows and the competitor process's cash flow. The competitor process may use mode 1 for a first range of financial positions and use mode 2 for a second range of financial positions. In other words, a competitor process may review its financial position to determine which of two modes is to be used. Review may occur at any suitable time, such as initially and after each update of the competitor process's financial position. Parameters that incorporate stock symbols illustrate a way to implement parameters for any stock symbol.

TABLE 5

| Parameter Name and Description for Competitor Process (CP) | Value for Relatively Unskilled Competitor | Value for Relatively Skilled Competitor |
|---|---|---|
| AbsoluteMinCashFlow—Abstain from transactions that decrease the CP's cash flow below this value | 250-1200 | 250-750 |
| SalaryMinCashFlowPercent—Abstain from transactions that decrease the CP's cash flow below this percent of the CP's salary | 10-100 | 15-25 |
| DrawBigDealAmountGatheringCash—Participate in transactions that may cost more than $6,000 when in mode 1 and cash on hand exceeds this value | 10,000-15,000 | 50,000-80,000 |
| DrawBigDealAmountGatheringCashFlow—Participate in transactions that cost more than $6,000 when in mode 2 and cash on hand exceeds this value | 7,500-12,500 | 5,000-8,000 |
| DollarsNeededPerDollarCashFlow—Remain in or revert to mode 1 when the product of this value and the difference between expenses and passive income is less than cash on hand | 24-40 | 28-32 |
| UseMinRoi—If this value is more than 0.5, participate in transactions (regardless of mode 1 or 2) according to a test based on MinRoi (see MinRoi) | 0-1 | 0 |
| MinRoi—If UseMinRoi is more than 0.5, participate in transactions when Projected ROI exceeds this value | 10-50 | N/A |
| DoStocks—If this value is 0, abstain from all stock transactions | 0 | 1 |
| DoOptions—If this value is 0, abstain from all stock options transactions | 0 | 1 |
| LookAhead—When estimating ROI prior to a stock transaction, base the ROI on the price as it was before (for negative values) or it will be (for positive values) this number of market intervals from current price. Note a user does not have the ability to use this strategic concept when looking forward, but could use a similar strategy looking backward. | −7 | 6 |
| DoShorts—If this value is 0, abstain from all stock short transactions. | 0 | 1 |
| MaxStockDollars—Maximum cost of an acceptable opportunity or defined transaction involving stock | 15,000 | 25,000 |
| MaxOptionDollars—Maximum cost of an acceptable opportunity or defined transaction involving stock options | 5,000 | 25,000 |
| AllowBankLoans—If this value is 0, do not borrow money to meet a down payment for a transaction. Otherwise, permit a loan if the resulting financial position does not violate AbsoluteMinCashFlow or SalaryMinCashFlowPercent, discussed above | 0 | 1 |
| AlwaysPayBackBankLoans—If this value is 1, define transactions to retire bank loans, if the resulting financial position does not violate AbsoluteMinCashFlow or SalaryMinCashFlowPercent, discussed above | 1 | 0 |

TABLE 5-continued

| Parameter Name and Description for Competitor Process (CP) | Value for Relatively Unskilled Competitor | Value for Relatively Skilled Competitor |
|---|---|---|
| AlwaysPayBackLoans—If this value is 1, define transactions to reduce expenses related to loans of any type, so long as the resulting financial position does not violate AbsoluteMinCashFlow or SalaryMinCashFlowPercent, discussed above | 1 | 0 |
| PayBackLoansOnlyToGetOutOfRatRace—"Getting out of the rat race" is synonymous with conventional retirement where there is no income from salary, and passive income exceeds expenses. If this value is greater than 0.5 and repayment of loans will reduce expenses sufficient to retire, then allow such a transaction to be defined. | 0-1 | 1 |
| PayBackLoansOnlyInGatherCashFlowMode—If this value is more than 0.5, then abstain from defining transactions to pay back loans while in mode 1. | 0-1 | 0 |
| ProbabilityToSellToAnotherPlayer—Before passing on an unacceptable opportunity, offer the opportunity for sale to another user (e.g., a user having the worst financial position) if a random number between 0 and 1 exceeds this value | 0 | 0 |
| SellMinAmount—Offer an opportunity to be sold to another user at a price equal to the sum of this amount, the total cost of the opportunity (e.g., its asset value) times SellTotalCostFactorPercent, and the down payment of the opportunity times SellDownPayFactorPercent | 0-100 | 100 |
| SellTotalCostFactorPercent—see SellMinAmount | 50-150 | 75-150 |
| SellDownPayFactorPercent—see SellMinAmount | 50-150 | 75-150 |
| SellToAnyone—If this value is more than 0.5, do not restrict the offer discussed above with reference to ProbabilityToSellToAnotherPlayer to only the user having the worst financial position. | 1 | 0 |
| ProbabilityToAuction—Before passing on an unacceptable opportunity, offer the opportunity for auction to another user (e.g., a user having the worst financial position) if a random number between 0 and 1 exceeds this value | 0 | 0 |
| AuctionMinAmount—Offer an opportunity to be auctioned to another user at a price equal to the sum of this amount, the total cost of the opportunity (e.g., its asset value) times AuctionTotalCostFactorPercent, and the down payment of the opportunity times AuctionDownPayFactorPercent | 0-100 | 100 |
| AuctionTotalCostFactorPercent—see AuctionMinAmount | 50-150 | 75-150 |
| AuctionDownPayFactorPercent—see AuctionMinAmount | 50-150 | 75-150 |
| AuctionToAnyone—analogous to SellToAnyone | 1 | 0 |
| GambleOnIpos—Accept opportunities to buy stock in Initial Public Offerings (IPOs) when the Projected ROI percent exceeds this percentage value | 1,000-1,000 | 100-300 |
| DoDirectMarketing—Accept opportunities to buy into a direct marketing business | 1 | 1 |
| BuyOK4U—If current price per share is less than this value, then accept opportunities to buy the stock whose symbol is "OK4U" | N/A | 20 |
| BuyMYT4U—If current price per share is less than this value, then accept opportunities to buy the stock whose symbol is "MYT4U" | N/A | 20 |
| BuyGRO4US—If current price per share is less than this value, then accept opportunities to buy the stock whose symbol is "GRO4US" | 10 | N/A |
| SellOK4U—If current price per share exceeds this value, then accept opportunities to sell and define transactions to sell the stock whose symbol is "OK4U" | N/A | 30 |
| SellMYT4U—If current price per share exceeds this value, then accept opportunities to sell and define transactions to sell the stock whose symbol is "MYT4U" | N/A | 30 |
| SellGRO4US—If current price per share exceeds this value, then accept opportunities to sell and define transactions to sell the stock whose symbol is "GRO4US" | 11 | N/A |
| OnlySellIfAGain—If this value is more than 0.5, abstain from participating in opportunities or defining transactions where the purchase price (or down payment) paid when acquiring the asset is greater than the proceeds from sale | 1 | 0 |
| AlwaysSellIfAGain—If this value is more than 0.5, participate in the first available opportunity or defined transaction for sale of the asset where the purchase price (or down payment) paid when acquiring the asset is less than the proceeds from sale | 1 | 0 |

Dynamic strategies may also be implemented, for example, with an additional strategy updating process (not shown); or by repeating selection by select strategy process 402. Updating or repeating selection may occur after lapse of a suitable time or on occurrence of triggering events (e.g., financial positions). Dynamic strategies may simulate a competitor that tires with experience or gains skill with experience.

To implement current strategy 434, an evaluation engine responds to opportunities and/or defines so called defined transactions. For example, evaluation engine 403 includes evaluate opportunity process 404 and define transaction process 406. At any suitable time evaluation engine may provide a buy/sell order (analogous to buy/sell orders discussed above) to update the financial position (314) of the competitor process. A suitable time may be on lapse of a suitable periodic interval, or as a consequence of action by the user. The parametric values that define an opportunity (338) as discussed above and the parametric values that define the current strategy (434) for this competitor process are input to logic (404) that determines a buy/sell order. Such logic may access the financial position (342) of this competitor process and current prices from price store 340. Conventional do-case and if-then logic may be used. Any conventional artificial intelligence decision making technology may be used (e.g., an expert system). As discussed above, the buy/sell order may include buy, sell, auction this opportunity among the users, sell this opportunity to a user (e.g., the user with the current worst financial position), and do nothing (e.g., pass).

A define transaction process 406 may create a favorable opportunity (one that improves the competitor process's financial position) after reviewing applicable records of current strategy store 434, financial position store 342, and price store 340 (e.g., to sell items listed in this competitor process's financial position). The financial position of one or more users may be considered by process 406. A competitor process may take an advantage over the user by considering forecasted price records for items (e.g., buy at a relatively low price to sell at a forecasted relatively higher price). Forecasted prices are not available to a user. Analogously, evaluate opportunity process 404 may access financial position records of other users and forecasted prices from price store 340.

According to various aspects of the present invention, system 100 may be implemented as a simulator of one or more of the business systems discussed above with reference to FIG. 1. Operation of the simulated confirm control (17, 19, or 21) may provide a buy/sell order as discussed above. In another implementation, the functions of system 100 may be integrated with any one or more of systems 12, 14, 16, 18, and 20.

According to various aspects of the present invention, engine 301 may be replaced with an engine that provides and updates prices 340 in accordance with one or more real markets. In such an implementation, opportunities may be real or hypothetical. Suitable changes to strategies 432 may be made to allow competitor processes to work without the availability of real prices at future market intervals.

In another implementation, competitor processes use the financial position of the user as a basis for providing suggested action on opportunities and suggested defined transactions. As such, competitor processes provide coaching to the user by example of consistent application of a strategy perhaps different from the user's strategy.

According to various aspects of the present invention, engine 305 may further communicate with real accounts (e.g., as managed by system 14 as discussed above). Financial position information may include information regarding real accounts. For example, when real and hypothetical opportunities are both provided by engine 303, engine 305 may update financial positions 342 that include both real and hypothetical amounts.

In yet another implementation, engine 401 records and analyzes user buy/sell orders, opportunities, and financial positions to form and update a definition of a strategy apparently being employed by the user. A reporting process (not shown) may contrast the apparent user strategy with competitor process strategies of strategies 432 for additional educational feedback to the user.

According to various aspects of the present invention, system 100 and methods discussed herein may be implemented as a game, the users being players of the game taking turns at play. In one implementation, the game includes an electronic game (e.g., including a user interface) of the type described in copending provisional patent application 60/465,210 by R. Kiyosaki filed Apr. 24, 2003. Opportunities, financial statements, game events, and game rules for system 100 as a game may be of the type described in U.S. Pat. Nos. 5,826,878; 6,106,300; and 6,032,957 suitably adapted to markets and transactions described herein (e.g., options, auctions, futures, shorts, puts, calls). During each play, an opportunity may be presented (with a specified transaction) to the player whose turn it is; and, any player may elect to initiate a user-defined transaction according to the particular user's current financial position (or financial statements). Financial statements may include a simplified income statement and balance sheet each suitably corresponding to GAAP.

Each market as discussed above may include prices that change as a group periodically. The period may be any suitable period of time (e.g., 1 minute) or may, for the game discussed above, be determined by game events. In one implementation, all market prices are adjusted at the beginning of each turn taken by any player and remain unchanged until the end of that player's turn. Because each player may signal the end of his or her turn without regard to other players, turns may be of unequal duration. A player who desires to specify and conduct a user-defined transaction may be prevented from doing so by another player who elects to signal the end of play for that turn before the desired user-defined transaction is defined or completed. In another implementation, a turn continues until all user-defined transactions have been provided for.

In a game hosted by server 102 on the Internet, players at clients 106 may be in any country. The server in such an implementation may serve each client in a multi-player game presenting a respective user interface to each player in accordance with the language, currency, and markets suited to teaching the user. For example, an Italian speaking player may select to use a user interface in the Italian language to develop skills trading on the New York Stock Exchange (NYSE) under United States laws and regulations using euros with appropriate conversions of currency. In a multi-player game, a competitor to the Italian speaking player may be an English speaking United States citizen. Comparison of financial positions by each user (e.g., for competition) is simplified by the server presenting to each user all other users' financial positions translated and in converted currencies to simplify comparison.

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A method, performed by a provided computer system having a user, the method for simulating a business system that conducts a market transaction, the method comprising:
   a. determining, by the computer system, a price for an opportunity to participate in the market, determining the price comprising:
      (1) selecting, by the computer system, a set of mathematical factors from a plurality of sets, wherein the set of factors is associated with a predetermined price pattern;
      (2) selecting, by the computer system, a current factor from the selected set; and
      (3) determining, by the computer system, a price in accordance with the current factor, wherein determining the price in accordance with the current factor includes applying the current factor to an immediately prior market interval;
   b. updating, by the computer system, a financial position of the user in response to a transaction; and
   c. performing, by the computer system, the transaction in accordance with the price and an input from the user through a user interface of the computer system, the input from the user corresponding in content to an input to the business system whereby the user develops skill in specifying market transactions to be conducted by reviewing changes in the user's financial position.

2. The method of claim 1, further comprising updating a financial position of an automated competitor that uses the business system for a second transaction, wherein the automated competitor determines whether to participate in the second transaction in accordance with a strategy selected from a set of stored strategies, and whereby the user develops skill in specifying market transactions to be conducted by being aware of the second transaction and changes in the automated competitor's financial position.

3. The method of claim 2, wherein the selected strategy includes a set of parameters for defining how the automated competitor responds to an opportunity to participate in the second transaction, and wherein at least one of the parameters is a numeric value randomly-selected from within a range of possible values.

4. The method of claim 2, further comprising replacing the selected strategy with a second strategy selected from the set of stored strategies.

5. The method of claim 1, wherein the set of factors is randomly selected from the plurality of sets.

6. The method of claim 1, further comprising performing multiple selections of factors from the plurality of sets.

7. The method of claim 6, wherein at least two of the multiple selections select the same set of factors from the plurality of sets.

8. A memory device comprising instructions that, when executed by a provided computer system, perform a method for simulating a business system that conducts a market transaction, the method comprising the steps of:
   a. determining, by the computer system, a price for an opportunity to participate in the market, determining the price comprising the steps of:
      (1) selecting, by the computer system, a set of mathematical factors from a plurality of sets, wherein the set of factors is associated with a predetermined price pattern;
      (2) selecting, by the computer system, a current factor from the selected set; and
      (3) determining, by the computer system, a price in accordance with the current factor, wherein determining the price in accordance with the current factor includes applying the current factor to an immediately prior market interval;
   b. updating, by the computer system, a financial position of a user of the computer system in response to a transaction; and
   c. performing, by the computer system, the transaction in accordance with the price and an input from the user, the input from the user corresponding in content to an input to the business system whereby the user develops skill in specifying market transactions to be conducted by reviewing changes in the user's financial position.

9. The memory device of claim 8, further comprising instructions for updating a financial position of an automated competitor that uses the business system for a second transaction, wherein the automated competitor determines whether to participate in the second transaction in accordance with a strategy selected from a set of stored strategies, and whereby the user develops skill in specifying market transactions to be conducted by being aware of the second transaction and changes in the automated competitor's financial position.

10. The memory device of claim 9, wherein the selected strategy includes a set of parameters for defining how the automated competitor responds to an opportunity to participate in the second transaction, and wherein at least one of the parameters is a numeric value randomly-selected from within a range of possible values.

11. The memory device of claim 9, further comprising instructions for replacing the selected strategy with a second strategy selected from the set of stored strategies.

12. The memory device of claim 8, wherein the set of factors is randomly selected from the plurality of sets.

13. The memory device of claim 8, further comprising instructions for performing multiple selections of factors from the plurality of sets.

14. The memory device of claim 13, wherein at least two of the multiple selections select the same set of factors from the plurality of sets.

* * * * *